United States Patent
Okamura et al.

(10) Patent No.: US 8,757,788 B2
(45) Date of Patent: Jun. 24, 2014

(54) INK JET INK, INK CARTRIDGE, AND INK JET RECORDING METHOD

(75) Inventors: Daiji Okamura, Tokyo (JP); Kousuke Yamasaki, Kawasaki (JP); Mitsuru Ishii, Kamagaya (JP); Yuuki Nishino, Kawasaki (JP); Yoichi Takada, Yokohama (JP); Hirofumi Ichinose, Tokyo (JP); Hiroshi Tomioka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 89 days.

(21) Appl. No.: 13/515,793

(22) PCT Filed: Oct. 28, 2010

(86) PCT No.: PCT/JP2010/006361
§ 371 (c)(1),
(2), (4) Date: Jun. 13, 2012

(87) PCT Pub. No.: WO2011/074167
PCT Pub. Date: Jun. 23, 2011

(65) Prior Publication Data
US 2012/0256984 A1 Oct. 11, 2012

(30) Foreign Application Priority Data
Dec. 16, 2009 (JP) .................................. 2009-285780

(51) Int. Cl.
*B41J 2/01* (2006.01)
*C09D 11/00* (2014.01)
*B41J 2/21* (2006.01)

(52) U.S. Cl.
CPC ............. *C09D 11/322* (2013.01); *B41J 2/2107* (2013.01)
USPC ............................................ 347/100; 347/95

(58) Field of Classification Search
CPC ........ B41J 2/01; B41J 2/2107; C09D 11/322; C09D 175/00; C09D 175/04
USPC .................... 347/95–100, 102; 523/160, 161; 106/31.13, 31.6
See application file for complete search history.

(56) References Cited

U.S. PATENT DOCUMENTS 6,034,154 A * 3/2000 Kase et al. ..................... 523/161
H002113 H   1/2005 Nichols et al.
(Continued)

FOREIGN PATENT DOCUMENTS

CN 101001927 A 7/2007
CN 101160335 A 4/2008
(Continued)

OTHER PUBLICATIONS

XP055096600, "Polyurethane Dispersions Derived From Polycarbonatediols and m-di (2-i socyanatopropyl) benzene", Da-Kong Lee et al., Polymer Engineering and Science_2009, p. 2265, vol. 49, No. 11, Nov. 1, 2009.

(Continued)

*Primary Examiner* — Matthew Luu
*Assistant Examiner* — Rut Patel
(74) *Attorney, Agent, or Firm* — Canon U.S.A., Inc., IP Division

(57) ABSTRACT

An ink jet ink contains a self-dispersing pigment and a polyurethane polymer. The polyurethane polymer has units derived from a polyisocyanate, a polyol having no acid group, and a diol having an acid group. The polyurethane polymer has a cross-linked structure and an acid value of the polyurethane polymer is 60 mgKOH/g or more and 100 mgKOH/g or less.

8 Claims, 1 Drawing Sheet

(56) References Cited

U.S. PATENT DOCUMENTS

| | | | |
|---|---|---|---|
| 8,497,317 B2 * | 7/2013 | Sekiyama et al. | 524/591 |
| 2006/0241228 A1 * | 10/2006 | Gertzmann et al. | 524/376 |
| 2007/0178373 A1 | 8/2007 | Hwang | |
| 2010/0197857 A1 * | 8/2010 | Tsuge et al. | 524/590 |
| 2013/0300804 A1 * | 11/2013 | Okamura et al. | 347/56 |
| 2013/0300805 A1 * | 11/2013 | Hakamada et al. | 347/56 |
| 2013/0300810 A1 * | 11/2013 | Nishino et al. | 347/86 |

FOREIGN PATENT DOCUMENTS

| | | |
|---|---|---|
| EP | 1167466 A1 | 1/2002 |
| JP | 2004-027154 A | 1/2004 |
| JP | 2005-515289 A | 5/2005 |
| JP | 2005-255860 A | 9/2005 |
| JP | 2007-070513 A | 3/2007 |
| JP | 2007-522285 A | 8/2007 |
| JP | 2008-024733 A | 2/2008 |
| JP | 2008-179657 A | 8/2008 |
| JP | 2008-280363 A | 11/2008 |
| JP | 2009-046780 A | 3/2009 |
| WO | 2005/071026 A1 | 8/2005 |
| WO | 2009/115831 A1 | 9/2009 |
| WO | 2009/143418 A1 | 11/2009 |

OTHER PUBLICATIONS

XP002718825, Database WPI, Week 200868,Thomson Scientific, London, GB;An 2008-160490 & JP 2008 179657 A (Toray Ind Inc) Aug. 7, 2008.

XP002718824, Database WPI, Week 200879, Thomson Scientific, London, GB; An 2008-N62244- & JP 2008 024733 a (Toray Ind Inc) Feb. 7, 2008.

\* cited by examiner

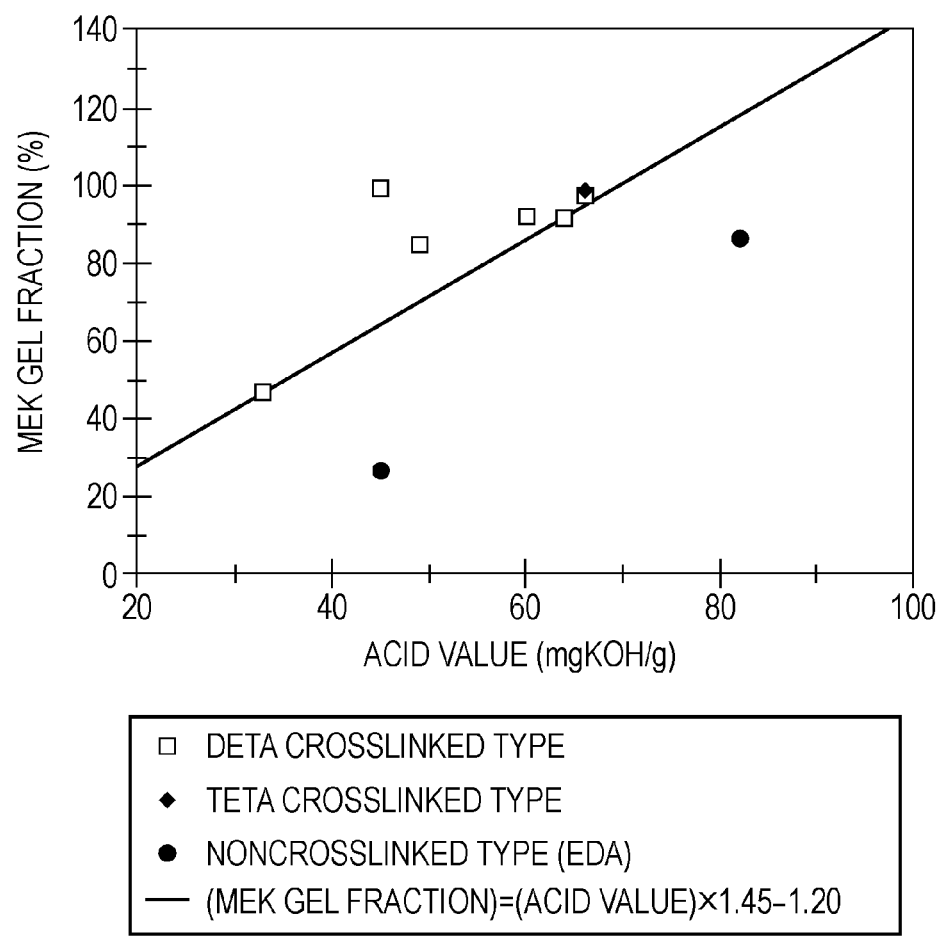

INK JET INK, INK CARTRIDGE, AND INK JET RECORDING METHOD

TECHNICAL FIELD

The present invention relates to an ink jet ink, an ink cartridge containing the ink jet ink, and an ink jet recording method.

BACKGROUND ART

With improvements in image quality and recording speed, ink jet recording apparatuses are increasingly being used in business. Examples of performance requirements required for ink jet inks for use in business include, but are not limited to, ink reliability (such as ejection stability), image quality (such as high optical density), and image fastness (such as scratch resistance and highlighter resistance). In order to improve these performance requirements, inks containing a pigment and an intramolecular-crosslinked polyurethane polymer have been investigated (Patent Literature 1 and Patent Literature 2). Patent Literature 1 discloses an ink jet ink that contains a coloring material and a cross-linked polyurethane polymer dispersion. Patent Literature 2 discloses a pigment dispersion that contains a compound having three or more hydroxy groups and a polyurethane polymer containing a soft segment having a carboxy group. The soft segment is composed of a polyol and other components.

The present inventors found that conventional inks containing a cross-linked polyurethane polymer have improved ink reliability, image quality, and image fastness but still do not satisfy recent requirements in business.

In an ink described in Patent Literature 1, the ratio of a cross-linked polyurethane polymer to a coloring material is approximately 1.0. Thus, an increase in coloring material content so as to increase optical density entails an increase in cross-linked polyurethane polymer content. This results in lower ink ejection stability. On the other hand, a decrease in cross-linked polyurethane polymer content so as to improve ejection stability entails a decrease in coloring material content, resulting in low optical density. Furthermore, the cross-linked polyurethane polymer has an acid value of 50 mgKOH/g or less and is therefore less hydrophilic. This often results in poor ink ejection stability. Thus, it is difficult to satisfy both optical density and ink ejection stability.

The present inventors found that a polyurethane polymer, as disclosed in Patent Literature 2, containing 10% by mole or more compound having three or more hydroxy groups based on all compounds having a hydroxy group becomes excessively rigid, resulting in low image fastness.

CITATION LIST

Patent Literature

PTL 1: PCT Japanese Translation Patent Publication No. 2007-522285
PTL 2: Japanese Patent Laid-Open No. 2008-179657

SUMMARY OF INVENTION

The present invention provides an ink jet ink that can achieve high optical density, high scratch resistance and highlighter resistance of images, and excellent ink ejection stability. The present invention also provides an ink cartridge containing an ink according to an embodiment of the present invention and an ink jet recording method.

An ink jet ink according to an embodiment of the present invention contains a self-dispersing pigment and a polyurethane polymer. The polyurethane polymer has units derived from a polyisocyanate, a polyol having no acid group, and a diol having an acid group. The polyurethane polymer has a cross-linked structure and an acid value of the polyurethane polymer is 60 mgKOH/g or more and 100 mgKOH/g or less.

The present invention can provide an ink jet ink that can achieve high optical density, high scratch resistance and highlighter resistance of images, and excellent ink ejection stability. The present invention can also provide an ink cartridge containing an ink according to an embodiment of the present invention and an ink jet recording method.

Further features of the present invention will become apparent from the following description of exemplary embodiments with reference to the attached drawings.

BRIEF DESCRIPTION OF DRAWINGS

FIG. 1 is a graph showing the relationship between the acid value and the MEK gel fraction of a polyurethane polymer according to an embodiment of the present invention.

DESCRIPTION OF EMBODIMENTS

The present invention will be described in detail in the following embodiments. An ink jet ink (hereinafter also referred to simply as an "ink") according to an embodiment of the present invention contains a self-dispersing pigment and a polyurethane polymer. The polyurethane polymer has units derived from a polyisocyanate, a polyol having no acid group, and a diol having an acid group. The polyurethane polymer has a cross-linked structure and an acid value of the polyurethane polymer is 60 mgKOH/g or more and 100 mgKOH/g or less.

Inclusion of a polyurethane polymer having a cross-linked structure and an acid value in the range of 60 to 100 mgKOH/g in an ink containing a self-dispersing pigment can particularly improve the scratch resistance and highlighter resistance of images. The present inventors believe the reason for that is as follows. When an ink is applied to a recording medium, a polyurethane polymer present in the vicinity of a pigment can improve the scratch resistance and highlighter resistance of images.

The acid value of the polyurethane polymer can be controlled through the proportion of a unit derived from a diol having an acid group. Inclusion of a unit derived from a diol having an acid group such that the polyurethane polymer has an acid value of 60 mgKOH/g or more increases the amount of polyisocyanate that reacts with the diol having an acid group. A polyurethane polymer obtained by further cross-linking tends to have a structure in which hydrophobic polyisocyanate units are densely spaced via a cross-linker. Thus, the cross-linked structure and an acid value in the range of 60 to 100 mgKOH/g synergistically increase the proportion of structures that include densely spaced hydrophobic portions. This can generate a hydrophobic interaction between the hydrophobic portions of the polyurethane polymer and hydrophobic portions of the pigment, resulting in the polyurethane polymer being located in the vicinity of the pigment. A self-dispersing pigment has a smaller steric hindrance than a polymer-dispersed pigment in which a pigment is dispersed by using a polymer dispersant. The smaller steric hindrance facilitates the hydrophobic interaction, resulting in the polyurethane polymer being located in the vicinity of the pigment.

Thus, these components can produce synergistic effects, achieving high scratch resistance and highlighter resistance of images.

The present inventors have proved through dynamic viscoelastic measurements described below that use of an ink containing a polyurethane polymer and a self-dispersing pigment allows the polyurethane polymer to be present in the vicinity of the pigment.

More specifically, an ink that contains a polyurethane polymer and a self-dispersing pigment was dried to form a thin film. The dynamic viscoelasticity of the film was measured by a method described in the example described below. The results showed the presence of two peaks attributed to a micro phase separation structure. A hydrophobic portion (hard segment) of a polyurethane polymer according to an embodiment of the present invention and a hydrophobic surface of a self-dispersing pigment produce a hydrophobic interaction. At the same time, a hydrophilic portion (soft segment) of the polyurethane polymer forms a cross-link between pigment particles. This results in micro phase separation of a sea-island structure. The polyurethane polymer present in the vicinity of the pigment can exhibit high scratch resistance and highlighter resistance of images.

The dynamic viscoelasticity was also measured in an ink that contained a polyurethane polymer and a self-dispersing pigment outside the scope of the present invention or an ink that contained a polyurethane polymer according to an embodiment of the present invention and a pigment (such as a polymer-dispersed pigment) other than a self-dispersing pigment. The results showed that these inks had one or no peak and did not have two peaks attributable to a micro phase separation structure. Two peaks were also not observed in the dynamic viscoelastic measurement of inks containing polyurethane polymers described in PCT Japanese Translation Patent Publication No. 2007-522285 and Japanese Patent Laid-Open No. 2008-179657.

As described above, whether or not an ink having an unknown composition contains a polyurethane polymer and a self-dispersing pigment for use in the present invention can be determined in a simplified manner by dynamic viscoelastic measurement. More specifically, whether or not an ink is within the scope of the present invention can be determined by the presence of a peak or the number of peaks in the dynamic viscoelastic measurement of the ink.

A polyurethane polymer having an acid value of 60 mgKOH/g or more has sufficient hydrophilicity to allow an ink to be stably discharged. Furthermore, an increase in the number of acid groups in the polyurethane polymer results in an increase in the amount of counter ions and an increase in the total amount of ions in the ink. This enhances the salting-out effect of the pigment associated with water evaporation after the ink is applied to a recording medium. This increases the pigment aggregation speed and localizes the pigment in the vicinity of a recording medium surface, thus achieving high optical density. As water evaporates, a self-dispersing pigment aggregates faster than a polymer-dispersed pigment in which the pigment is dispersed by using a polymer dispersant. Thus, the components can produce synergistic effects, achieving higher optical density.

The polyurethane polymer has an acid value of 100 mgKOH/g or less. An increase in the mass proportion of a unit derived from a diol having an acid group so as to increase the acid value results in a decrease in the mass proportion of a unit derived from a polyol component having no acid group in the polyurethane polymer. An acid value of the polyurethane polymer above 100 mgKOH/g results in a low proportion of a unit derived from a polyol component having no acid group, which imparts flexibility to the polyurethane polymer. This makes the polyurethane polymer film very rigid, resulting in low image fastness property.

Ink Jet Ink

The components of an ink jet ink according to an embodiment of the present invention will be described below.

Self-Dispersing Pigment

An ink according to an embodiment of the present invention contains a self-dispersing pigment in which at least one hydrophilic group is bonded to the pigment surface directly or through another atomic group. The at least one hydrophilic group may be partly or entirely free in the ink.

Examples of the pigment for use in an ink according to an embodiment of the present invention include, but are not limited to, inorganic pigments, such as carbon black, and organic pigments. Any known pigment can be used in an ink jet ink according to an embodiment of the present invention. The present inventors found that the polyurethane polymer is physically adsorbed on inorganic pigments more easily than organic pigments. Use of inorganic pigments therefore more effectively improves scratch resistance and highlighter resistance of images. The amount (% by mass) of self-dispersing pigment in the ink ranges from 0.1% to 15.0% by mass, preferably 1.0% to 8.0% by mass, based on the total mass of the ink. A self-dispersing pigment content below 1.0% by mass may result in insufficient optical density. A self-dispersing pigment content above 8.0% by mass may result in poor ink jet characteristics, such as sticking resistance.

Examples of the self-dispersing pigment include, but are not limited to, pigments having a hydrophilic group on the surface (self-dispersing pigments modified with hydrophilic groups) and pigments having a polymer organic group on the surface (polymer-bonded self-dispersing pigments). Use of the self-dispersing pigment can obviate the necessity for the addition of a dispersant to disperse the pigment in the ink or can reduce the amount of dispersant. In the present invention, the self-dispersing pigment modified with hydrophilic groups can be used. The pigment can be self-dispersing carbon black. Self-dispersing carbon black can promote a change in the state of an ink (an increase in viscosity, association or aggregation of a coloring material, or the like) as the ink dries on a recording medium. Thus, self-dispersing carbon black is very effective in achieving high optical density.

Self-Dispersing Pigment Modified with Hydrophilic Groups

Examples of the hydrophilic group to be attached to the pigment surface include, but are not limited to, —COOM, —$SO_3M$, —$PO_3HM$, and —$PO_3M_2$, wherein "M" denotes a hydrogen atom, an alkali metal, ammonium, or an organic ammonium. When "M" denotes an alkali metal, such as lithium, sodium, or potassium, the ink has excellent ejection stability. The hydrophilic group may be bonded to the pigment surface directly or via another atomic group (—R—). Examples of another atomic group (—R—) include, but are not limited to, alkylene groups having 1 to 12 carbon atoms, substituted and unsubstituted phenylene groups, and substituted and unsubstituted naphthylene groups.

Polymer-Bonded Self-Dispersing Pigment

Polymers for use in polymer-bonded self-dispersing pigments may be any known polymer used in ink jet inks, for example, acrylic acid polymers. A polymer to be bonded to a pigment preferably has a polystyrene equivalent weight-average molecular weight in the range of 1,000 to 12,000, more preferably 3,000 to 8,000, as determined by gel permeation chromatography (GPC). The polymer preferably has an acid value in the range of 50 to 300 mgKOH/g, more preferably 120 to 250 mgKOH/g.

Polyurethane Polymer

A polyurethane polymer for use in an ink according to an embodiment of the present invention has units derived from a polyisocyanate, a polyol having no acid group, and a diol having an acid group, has a cross-linked structure, and has an acid value in the range of 60 to 100 mgKOH/g.

The phrase "a polyurethane polymer has a cross-linked structure", as used herein, means that the polyurethane polymer has a three-dimensional network structure produced by a urethane reaction within the polyurethane polymer molecule. Thus, the structure of the polyurethane polymer should have at least one unit derived from a compound having three or more reactive functional groups. Examples of the compound having three or more reactive functional groups include, but are not limited to, trifunctional and higher functional polyisocyanates, trifunctional and higher functional polyols, and trifunctional and higher functional chain extension agents (such as trifunctional and higher functional polyamines). The cross-linked structure can be formed with a trifunctional or higher functional polyamine. A trifunctional or higher functional polyisocyanate or a trifunctional or higher functional polyol can three-dimensionally form a urethane bond, forming a cross-linked structure. A trifunctional or higher functional polyamine can three-dimensionally form a urea bond, forming a cross-linked structure. A three-dimensional structure formed by a hydrogen bond between urethane bonds or between a urethane bond and a hydroxy group of a polyol is not considered as a cross-linked structure in the present invention. A polyurethane polymer produced by a liquid-liquid reaction type cross-linking reaction and added to an ink after the cross-linking reaction is considered as a polyurethane polymer in the present invention. However, a polyurethane polymer to be cross-linked after being applied to a recording medium is not considered as a cross-linked structure in the present invention.

The present inventors found that whether or not a polyurethane polymer has a cross-linked structure defined in the present invention can be determined from the relationship between the methyl ethyl ketone (MEK) gel fraction and the acid value of the polyurethane polymer. The MEK gel fraction is determined by dividing the mass of a residual polyurethane polymer film after Soxhlet extraction in MEK by the mass of the polyurethane polymer film before extraction. FIG. 1 shows the relationship between the acid value and the MEK gel fraction of various polyurethane polymers produced with diethylenetriamine (DETA), triethylenetetramine (TETA), and ethylenediamine (EDA). From this result, the present inventors found that a polyurethane polymer having a MEK gel fraction that satisfies the following formula (1) has a cross-linked structure.

[Math.1]

$$\text{MEK gel fraction} \geq \text{acid value} \times 1.45 - 1.20 \quad (1)$$

In the present invention, a polyurethane polymer having a non-core-shell structure can be used. An exemplary polyurethane polymer includes a urethane polymer that can achieve high fastness as the core and an acryl/urethane polymer that can improve ink ejection stability as the shell. Use of a polymer having a high acid value so as to improve ejection stability may result in a decrease in scratch resistance and highlighter resistance of images because of the high acid value.

Polyisocyanate

The term "polyisocyanate", as used herein, refers to a compound having two or more isocyanate groups. Examples of the polyisocyanate for use in the present invention include, but are not limited to, aliphatic polyisocyanates, alicyclic polyisocyanates, aromatic polyisocyanates, and araliphatic polyisocyanates. Examples of the aliphatic polyisocyanate include, but are not limited to, tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanate include, but are not limited to, isophorone diisocyanate, hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane. Examples of the aromatic polyisocyanate include, but are not limited to, tolylene diisocyanate, 2,2'-diphenylmethane diisocyanate, 2,4-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of the araliphatic polyisocyanate include, but are not limited to, dialkyldiphenylmethane diisocyanates, tetraalkyldiphenylmethane diisocyanates, and alpha,alpha,alpha,alpha-tetramethylxylylene diisocyanate. These polyisocyanates may be used alone or in combination. Among these polyisocanates, alicyclic polyisocyanates can be used in the present invention. Among the alicyclic polyisocyanates, an isophorone diisocyanate can be used.

Polyisocyanates having three or more isocyanate groups, for example, various isocyanate prepolymers, such as polyisocyanurate polyisocyanates, adduct-type polyisocyanates, and biuret polyisocyanates can also be used to introduce a cross-linked structure into a polyurethane polymer. It is desirable that the mass proportion of a unit derived from a trifunctional or higher functional polyisocyanate based on the total amount of polyisocyanate compounds is 5.0% by mass or more and 90.0% by mass or less. Less than 5.0% by mass of the trifunctional or higher functional polyisocyanate may have insufficient improving effects on scratch resistance and highlighter resistance of images. More than 90.0% by mass of the trifunctional or higher functional polyisocyanate may result in a hardened and less flexible polyurethane polymer film and therefore have insufficient improving effects on scratch resistance and highlighter resistance of images and ink ejection stability.

Compound Having Two or More Hydroxy Groups

In the synthesis of a polyurethane polymer, the polyisocyanate described above is allowed to react with a compound having two or more hydroxy groups to form a urethane bond. The present inventors searched for an optimum compound having two or more hydroxy groups with respect to scratch resistance and highlighter resistance of images and ink ejection stability. A comparison was made between inks that contained a pigment having low ejection stability and three polyurethane polymers A, B, and C produced with different compounds having two or more hydroxy groups. The polyurethane polymer A was produced with a polyether polyol. The polyurethane polymer B was produced with a polyol having an acid group within the molecular chain (for example, a carboxylic-acid-modified polycaprolactone diol). The polyurethane polymer C was produced with a polyether polyol and a diol having an acid group (for example, dimethylolpropionic acid). Table 1 shows the compositions of the three polyurethane polymers A to C.

TABLE 1

Compositions of polyurethane polymers A, B, and C

| | Polyisocyanate | Compound having two or more hydroxy groups |
|---|---|---|
| Polyurethane polymer A | Isophorone diisocyanate | Polyether polyol |
| Polyurethane polymer B | | Carboxylic-acid-modified polycaprolactone diol |
| Polyurethane polymer C | | Polyether polyol and dimethylolpropionic acid |

The polyurethane polymers B and C had higher ink ejection stability than the polyurethane polymer A. However, the polyurethane polymer B had much lower scratch resistance and highlighter resistance of images than the polyurethane polymer A. Although the reason for that is not clear, introduction of the polyol having an acid group probably disturbed the balance between toughness and flexibility. The polyurethane polymer C had higher scratch resistance and highlighter resistance of images than the polyurethane polymer A. These results show that a combination of a polyol having no acid group and a diol having an acid group in the synthesis of a polyurethane polymer is important as a compound having two or more hydroxy groups that can react with the polyisocyanate to form a urethane bond.

Thus, an embodiment of the present invention involves the use of both a polyol having no acid group and a diol having an acid group as a compound having two or more hydroxy groups. More specifically, a polyol having no acid group imparts toughness and flexibility to a polyurethane polymer, thereby improving scratch resistance and highlighter resistance of images, and a predetermined amount of diol having an acid group corresponding to the acid value defined in the present invention improves ink ejection stability. As described above, use of a polyol having an acid group alone as a compound having two or more hydroxy groups cannot achieve the advantages of the present invention. A polyol having no acid group and a diol having an acid group will be individually described below.

Polyol Having No Acid Group

Examples of the polyol having no acid group for use in the present invention include, but are not limited to, polyester polymers including polyester polyols, polyether polymers including polyether polyols, polycarbonate polymers including polycarbonate diols, and polymers including polyols having no acid group (for example, polyhydroxy polyacetal, polyhydroxy polyacrylate, polyhydroxy polyesteramide, and polyhydroxy polythioether). These polymers can also be used in combination. It is desirable that a polyol having no acid group for use in the present invention has 13 to 250 carbon atoms. A polyol having 13 to 250 carbon atoms can impart moderate flexibility to a film and has improving effects on scratch resistance and highlighter resistance of images. It is desirable that a polyol having no acid group has a polystyrene equivalent number-average molecular weight in the range of 600 to 4,000 as determined by GPC. A number-average molecular weight below 600 may result in a film having less flexibility and insufficient improving effects on scratch resistance and highlighter resistance of images. A number-average molecular weight above 4,000 may result in an excessively flexible film and insufficient improving effects on scratch resistance and highlighter resistance of images.

Examples of the polyester polyols include, but are not limited to, esters derived by reacting acid components with poly(alkylene glycol)s, dihydric alcohols, and trivalent and higher valent alcohols. Examples of the acid components include, but are not limited to, aromatic dicarboxylic acids, alicyclic dicarboxylic acids, and aliphatic dicarboxylic acids. Examples of the aromatic dicarboxylic acids include, but are not limited to, isophthalic acid, terephthalic acid, orthophthalic acid, 1,4-naphthalenedicarboxylic acid, 2,5-naphthalenedicarboxylic acid, 2,6-naphthalenedicarboxylic acid, biphenyldicarboxylic acid, and tetrahydrophthalic acid. Examples of the alicyclic dicarboxylic acids include, but are not limited to, hydrogenated compounds of the aromatic dicarboxylic acids described above. Examples of the aliphatic dicarboxylic acids include, but are not limited to, malonic acid, succinic acid, tartaric acid, oxalic acid, glutaric acid, adipic acid, pimelic acid, suberic acid, azelaic acid, sebacic acid, alkylsuccinic acids, linoleic acid, maleic acid, fumaric acid, mesaconic acid, citraconic acid, and itaconic acid. Reactive derivatives of these acid components, such as acid anhydrides, alkyl esters, and acid halides, can also be used as acid components of the polyester polyols. The acid components of the polyester polyols may be used alone or in combination. These polyester polyols may be used alone or in combination. Examples of the poly(alkylene glycol)s include, but are not limited to, poly(ethylene glycol), poly(propylene glycol), poly(tetramethylene glycol), and an ethylene glycol-propylene glycol copolymer. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trivalent and higher valent alcohols include, but are not limited to, glycerin, trimethylolpropane, 1,2,5-hexanetriol, 1,2,6-hexanetriol, and pentaerythritol. These polyester polyols may be used alone or in combination.

Examples of the polyether polyol include, but are not limited to, addition polymers of alkylene oxides and poly(alkylene glycol)s, dihydric alcohols, and trivalent and higher valent alcohols. Examples of the poly(alkylene glycol)s include, but are not limited to, poly(ethylene glycol), poly(propylene glycol), poly(tetramethylene glycol), and an ethylene glycol-propylene glycol copolymer. Examples of the dihydric alcohols include, but are not limited to, hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trivalent and higher valent alcohols include, but are not limited to, glycerin, trimethylolpropane, 1,2,5-hexanetriol, 1,2,6-hexanetriol, and pentaerythritol. Examples of the alkylene oxides include, but are not limited to, ethylene oxide, propylene oxide, butylene oxide, and alpha-olefin oxides. These polyether polyols may be used alone or in combination.

Examples of the polycarbonate diols include, but are not limited to, polycarbonate diols having 1,6-hexanediol as the basic skeleton and polycarbonate diols produced by known methods, for example, polycarbonate diols produced by the reaction between an aliphatic diol component and phosgene or a carbonate component, such as an alkylene carbonate, a diary carbonate, or a dialkyl carbonate. These polycarbonate diols may be used alone or in combination.

Among the polyols having no acid group, polyether polyols can be used in the present invention. The polyether polyols can impart moderate flexibility to the polyurethane polymer, thereby improving scratch resistance and highlighter resistance of images. The polyether polyols have relatively high hydrophilicity and therefore improve ink ejection stability. Among the polyether polyols, poly(propylene glycol) can be used. The poly(propylene glycol) improves the hydrophilicity of a polyurethane polymer and ink ejection stability.

A trivalent or higher valent alcohol, such as trimethylolpropane, may be added as a cross-linker to introduce a cross-linked structure into a polyurethane polymer. It is desirable that the mass proportion of a unit derived from a trivalent or higher valent alcohol is 0.05% by mass or more and 5.0% by mass or less of the total mass of a polyisocyanate, a polyol having no acid group, and a diol having an acid group. Less than 0.05% by mass of the trivalent or higher valent alcohol may have insufficient improving effects on scratch resistance and highlighter resistance of images. More than 5.0% by mass of the trivalent or higher valent alcohol may result in a hardened and less flexible polyurethane polymer film and therefore have insufficient improving effects on scratch resistance and highlighter resistance of images and ink ejection stability. It is desirable that the mass proportion of a unit derived from a polyhydric alcohol is 1% by mole or more and 5% by mole or less of the total moles of all compounds having a hydroxy group (a polyhydric alcohol, a polyol having no acid group, and a diol having an acid group) constituting a polyurethane polymer. Less than 1% by mole of the polyhydric alcohol may have insufficient improving effects on scratch resistance and highlighter resistance of images. More than 5% by mole of the polyhydric alcohol may result in a hardened and less flexible polyurethane polymer film and therefore have insufficient improving effects on scratch resistance and highlighter resistance of images and ink ejection stability.

Diol Having Acid Group

The term "a diol having an acid group", as used herein, refers to a diol having an acid group, such as a carboxy group, a sulfo group, or a phosphate group, in the molecule. A diol having an acid group for use in the present invention can have 1 to 7 carbon atoms. When the diol having an acid group has 8 or more carbon atoms, the resulting polyurethane polymer tends to have the acid group in the soft segment. This may disturb the balance between toughness and flexibility and result in low scratch resistance and highlighter resistance. Examples of the diol having an acid group for use in the present invention include, but are not limited to, dimethylolacetic acid, dimethylolpropionic acid, and dimethylolbutanoic acid. At least one of dimethylolpropionic acid and dimethylolbutanoic acid can be used.

Chain Extension Agent

A chain extension agent is a compound that can react with a residual isocyanate group in a polyisocyanate unit of a urethane prepolymer. The residual isocyanate group is an isocyanate group that does not form a urethane bond. Examples of a chain extension agent that can be used in the synthesis of a polyurethane polymer contained in an ink according to an embodiment of the present invention include, but are not limited to, polyvalent amine compounds, such as trimethylolmelamine and derivatives thereof, dimethylolurea and derivatives thereof, dimethylolethylamine, diethanolmethylamine, dipropanolethylamine, dibutanolmethylamine, ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine, polyamide polyamine, and polyethylene polyimine. These chain extension agents may be used alone or in combination.

A trifunctional or higher functional chain extension agent can be used to introduce a cross-linked structure into a polyurethane polymer. Examples of the chain extension agent that can introduce a cross-linked structure into a polyurethane polymer include, but are not limited to, trimethylolmelamine, diethylenetriamine, triethylenetetramine, and tetraethylenepentamine. Among the chain extension agents that can introduce a cross-linked structure into a polyurethane polymer, a trifunctional or higher functional polyamine is highly reactive with an isocyanate group. Among the trifunctional or higher functional polyamines, diethylenetriamine or triethylenetetramine can be used. Diethylenetriamine and triethylenetetramine having three and four amino groups, respectively, can efficiently react with a residual isocyanate group to form a cross-linked structure, and have a moderately flexible molecular structure.

The amount of trifunctional or higher functional polyamine may be 10% by mole or more based on the amount of residual isocyanate group in a urethane prepolymer. Less than 10% by mole of the trifunctional or higher functional polyamine has small cross-linking effects and therefore may have insufficient improving effects on scratch resistance and highlighter resistance of images. The amount of trifunctional or higher functional polyamine may be 40% by mole or more based on the amount of residual isocyanate group in a urethane prepolymer. 40% or more of the trifunctional or higher functional polyamine has many cross-linking sites in a polyurethane polymer chain. This promotes a hydrophobic interaction with a self-dispersing pigment. The hydrophobic interaction facilitates the presence of a polyurethane polymer in the vicinity of the pigment, thus improving scratch resistance and highlighter resistance of images. The amount of trifunctional or higher functional polyamine may be 85% by mole or less based on the amount of residual isocyanate group in the urethane prepolymer. More than 85% by mole of the trifunctional or higher functional polyamine results in a rigid and less flexible polyurethane polymer film because of a very high degree of cross-linking and therefore may have insufficient improving effects on scratch resistance and highlighter resistance of images and ink ejection stability.

Whether or not a polyurethane polymer contains 40% by mole or more trifunctional or higher functional polyamine based on the residual isocyanate group in a urethane prepolymer can be determined by tetrahydrofuran (THF) gel fraction as described below. First, a polyurethane polymer film prepared from a polyurethane polymer dispersion, which was proved to have a cross-linked structure by MEK gel fraction measurement, is immersed in THF for 24 hours. The mass of THF-insoluble fraction of the polyurethane polymer film is then measured. A THF gel fraction is calculated by dividing the mass of THF-insoluble fraction by the mass of the polyurethane polymer film before immersion. When the THF gel fraction is 95% or more, the amount of trifunctional or higher functional polyamine used in the polyurethane polymer can be determined to be 40% by mole or more based on the amount of residual isocyanate group in the urethane prepolymer. Although the cross-linking by a polyamine is difficult to directly analyze, the present inventors found that the THF gel fractions of various polyurethane polymers cross-linked with cross-linkers other than polyamines are less than 95%. This is probably because the amine group has the highest reactivity to the isocyanate group.

Synthesis Method and Analysis Method of Polyurethane Polymer

A method for synthesizing a polyurethane polymer according to an embodiment of the present invention may be any known method, including the following method. First, an excessive equivalent of a polyisocyanate, a polyol having no acid group, and a diol having an acid group are allowed to react in the presence or absence of an organic solvent having a boiling point of 100 degrees Celsius or less to synthesize a urethane prepolymer having isocyanate groups at molecular ends. A carboxy group and/or a sulfo group of the urethane prepolymer is then neutralized with a neutralizing agent. The neutralized urethane prepolymer is further allowed to react in an aqueous solution containing a chain extension agent. An organic solvent remaining in the system, if any, may be removed.

Examples of the neutralizing agent include, but are not limited to, alkanolamines, such as N,N-dimethylethanolamine, N,N-diethylethanolamine, diethanolamine, and triethanolamine, inorganic bases, such as sodium hydroxide, potassium hydroxide, and ammonia, and organic bases, such as trimethylamine and triethylamine Examples of the neutralizing agent for use in the present invention include, but are not limited to, neutralizing agents containing alkali metals, such as sodium hydroxide and potassium hydroxide. The present inventors found that neutralizing agents containing alkali metals can provide higher ink ejection stability than neutralizing agents containing amines. The molar equivalent ratio of neutralizing agent to carboxy and/or sulfo group in the urethane prepolymer preferably ranges from 0.5 to 1.0, more preferably 0.8 to 1.0. The molar equivalent ratio above this upper limit may result in poor workability because of the destabilization of the resulting aqueous dispersion and an increase in the viscosity of the aqueous dispersion.

The polyurethane polymer having a cross-linked structure may be produced in the presence of an organic solvent. Examples of the solvent include, but are not limited to, ketones, such as methyl ethyl ketone and acetone; esters, such as methyl acetate and ethyl acetate; acetonitrile; and tetrahydrofuran. These solvents may be used alone or in combination. The solvent may have a boiling point equal to or less than the boiling point of water, 100 degrees Celsius. A solvent having a boiling point above 100 degrees Celsius may remain in a polyurethane polymer dispersion finally produced. In some cases, therefore, the residual organic solvent must be removed, for example, under vacuum.

The composition, the molecular weight, and the acid value of the polyurethane polymer can be measured by conventional methods. Specifically, an ink can be separated into a sediment and a supernatant liquid by centrifugation, and the sediment and supernatant liquid can be analyzed. Since the pigment is insoluble in organic solvents, the polyurethane polymer can also be isolated by solvent extraction. Although the ink itself can be analyzed, the isolation of the polyurethane polymer can improve the accuracy of measurement. More specifically, after the ink is centrifuged at 80,000 rpm, the supernatant liquid is analyzed with a Fourier transform infrared spectrophotometer (FT-IR). The types of polyisocyanate and polyol having no acid group can easily be determined from the absorption wavelengths characteristic of the urethane bond. Furthermore, the supernatant liquid can be precipitated with hydrochloric acid, and the dried precipitate can be dissolved in chloroform. The chloroform solution can be subjected to nuclear magnetic resonance (NMR) to determine the molecular weight of the polyol having no acid group. The acid value of the polyurethane polymer can be measured by titrimetry. In the examples described below, the acid value of the polyurethane polymer can be measured by potentiometric titration of the polymer dissolved in tetrahydrofuran (THF) with an automatic potentiometric titrator AT510 (manufactured by Kyoto Electronics Manufacturing Co., Ltd.) using a potassium hydroxide-ethanol titrant. The average molecular weight of the polyurethane polymer can be measured by gel permeation chromatography (GPC). The conditions for GPC are as follows:

Apparatus: Alliance GPC 2695 (manufactured by Waters Co.),
Column: Four Shodex KF-806M columns (manufactured by Showa Denko K.K.) in series,
Mobile phase: THF (a guaranteed reagent),
Flow rate: 1.0 mL/min,
Oven temperature: 40.0 degrees Celsius,
Injection volume of sample solution: 0.1 mL,
Detector: refractive index (RI), and
Polystyrene standard samples: PS-1 and PS-2 (manufactured by Polymer Laboratories Ltd.) (14 samples having a molecular weight of 7,500,000, 2,560,000, 841,700, 377,400, 320,000, 210,500, 148,000, 96,000, 59,500, 50,400, 28,500, 20,650, 10,850, 5,460, 2,930, 1,300, and 580).

The amount (% by mass) of polyurethane polymer for use in an ink according to an embodiment of the present invention may preferably be less than 2.0% by mass, more preferably 0.1% or more but less than 2.0% by mass, based on the total mass of the ink. Less than 0.1% by mass of the polyurethane polymer may have insufficient improving effects on scratch resistance and highlighter resistance of images. 2.0% by mass or more of the polyurethane polymer may have insufficient improving effects on ink ejection stability. The ink may further contain another polymer without compromising the advantages of the present invention.

It is desirable that the ratio of the amount (% by mass) of polyurethane polymer to the amount (% by mass) of self-dispersing pigment in the ink is 0.1 or more and 0.9 or less. The ratio below 0.1 may result in insufficient improving effects on scratch resistance and highlighter resistance of images. The ratio above 0.9 may result in insufficient improving effects on ink ejection stability.

A polyurethane polymer for use in an ink according to an embodiment of the present invention may have a polystyrene equivalent weight-average molecular weight (Mw) in the range of 10,000 to 60,000 as determined by gel permeation chromatography (GPC).

Aqueous Medium

An ink according to an embodiment of the present invention may contain an aqueous medium, such as water or a mixed solvent of water and a water-soluble organic solvent. The amount (% by mass) of water-soluble organic solvent in the ink may range from 3.0% to 50.0% by mass based on the total mass of the ink. The water-soluble organic solvent may be any known solvent generally used in ink jet inks Examples of the water-soluble organic solvent include, but are not limited to, alkyl alcohols having 1 to 4 carbon atoms, amides, ketones, keto-alcohols, ethers, poly(alkylene glycol)s, glycols, alkylene glycols in which the alkylene group has 2 to 6 carbon atoms, polyhydric alcohols, alkyl ether acetates, alkyl ethers of polyhydric alcohols, nitrogen-containing compounds, and sulfur-containing compounds. These water-soluble organic solvents may be used alone or in combination. Water can be deionized water (ion-exchanged water). The water content (% by mass) of the ink may range from 50.0% to 95.0% by mass based on the total mass of the ink. The ink viscosity at 25 degrees Celsius may be 6 cps or less. The ink viscosity can be controlled through the composition and amount of the aqueous medium. An ink viscosity above 6 cps at 25 degrees Celsius may result in insufficient improving effects on ink ejection stability.

Other Additive Agents

In addition to the components described above, an ink according to an embodiment of the present invention may further contain a polyhydric alcohol, such as trimethylolpropane or trimethylolethane, urea, a urea derivative, such as ethylene urea, and/or a water-soluble organic compound that is solid at normal temperature. An ink according to an embodiment of the present invention may also contain an additive agent, such as a polymer other than the polyurethane polymer, a surfactant, a pH adjusting agent, an anticorrosive, a preservative, a fungicide, an antioxidant, a reduction inhibitor, an evaporation accelerator, and/or a chelator. In the case that an ink contains a polymer other than the polyurethane polymer, the total amount of polymers in the ink may range from 0.01% to 10.00% by mass based on the total mass of the ink.

Ink Cartridge

An ink cartridge according to an embodiment of the present invention includes an ink storage portion for storing an ink according to an embodiment of the present invention. The ink storage portion includes an ink chamber and a chamber for housing a negative-pressure-generating member. The ink chamber stores liquid ink. The chamber for housing a negative-pressure-generating member includes a negative-pressure-generating member for storing ink by the action of a negative pressure. Alternatively, an ink cartridge according to an embodiment of the present invention may include no ink chamber and include an ink storage portion that includes a negative-pressure-generating member for storing the whole ink. Alternatively, an ink cartridge according to an embodiment of the present invention may include an ink storage portion and a recording head.

Ink Jet Recording Method

In an ink jet recording method according to an embodiment of the present invention, recording is performed by discharging an ink according to an embodiment of the present invention from a discharge port of a recording head onto a recording medium by an ink jet method in response to recording signals. The ink may be discharged from a discharge port of a recording head by the action of thermal energy. The term "recording", as used herein, includes recording on a recording medium, such as a sheet of glossy paper or plain paper, with an ink according to an embodiment of the present invention or printing on a non-liquid-absorbing substrate, such as a glass sheet, a plastic sheet, or a film, with an ink according to an embodiment of the present invention.

EXAMPLES

The present invention will be further described in the following examples and comparative examples. However, the present invention is not limited to these examples. Unless otherwise specified, "part" and "%" in the examples are based on mass.

Preparation of Pigment Dispersion

Preparation of Pigment Dispersion A 1.5 g of 4-amino-1,2-benzenedicarboxylic acid was added to a solution containing 5 g of concentrated hydrochloric acid dissolved in 5.5 g of water at 5 degrees Celsius. A vessel containing this solution was placed in an ice bath to maintain the solution at 10 degrees Celsius or less. To this solution was added a solution containing 1.8 g of sodium nitrite dissolved in 9 g of water at 5 degrees Celsius. After the solution was stirred for 15 minutes, 6 g of carbon black was added while stirring. The carbon black had a specific surface area of 220 $m^2/g$ and a DBP absorption of 105 mL/100 g. After the solution was stirred for another 15 minutes, the resulting slurry was filtered through a filter paper (trade name standard filter paper No. 2, manufactured by Advantec Toyo Kaisha, Ltd.). Particles on the filter were sufficiently washed with water. The particles were dried in an oven at 110 degrees Celsius to prepare self-dispersing carbon black. The self-dispersing carbon black was dispersed in water at a pigment content of 10.0% to prepare a dispersion. This pigment dispersion contained self-dispersing carbon black having a —$C_6H_3$—$(COONa)_2$ group on the surface. Sodium ions of the pigment dispersion were then substituted with potassium ions by an ion exchange method to prepare a pigment dispersion A. The pigment dispersion A contained self-dispersing carbon black having a —$C_6H_3$—$(COOK)_2$ group on the surface. The pigment dispersion B had a pigment content of 10.0% and a pH of 8.0. The pigment had an average particle size of 80 nm.

Preparation of Pigment Dispersion B

Five hundred grams of carbon black having a specific surface area of 220 $m^2/g$ and a DBP absorption of 112 mL/100 g, 45 g of aminophenyl(2-sulfoethyl)sulfone, and 900 g of distilled water in a reactor were stirred at 300 rpm at a temperature of 55 degrees Celsius for 20 minutes. Forty grams of 25% sodium nitrite was then added dropwise to the mixture for 15 minutes. After 50 g of distilled water was further added to the mixture, the mixture was allowed to react at 60 degrees Celsius for two hours. The resulting product was removed from the reactor while being diluted with distilled water such that the solid content was 15.0%. After centrifugation and purification to remove impurities, a dispersion (1) was obtained. Carbon black in the dispersion (1) had aminophenyl(2-sulfoethyl)sulfone functional groups bonded to the surface. The number of moles of functional groups bonded to carbon black in the dispersion (1) was determined as described below. The sodium ion concentration of the dispersion (1) measured with a probe-type sodium electrode was converted into a value per mole of carbon black powder to determine the number of moles of functional groups bonded to carbon black. The dispersion (1) was then added dropwise to a pentaethylenehexamine solution for one hour with vigorous stirring while the temperature was maintained at room temperature. The pentaethylenehexamine content ranged from 1 to 10 times the number of moles of sodium ions measured above. The amount of solution was equal to the amount of dispersion (1). After this mixture was stirred for 18 to 48 hours, the mixture was purified to yield a dispersion (2) having a solid content of 10.0%. Carbon black in the dispersion (2) had pentaethylenehexamine bonded to the surface.

One hundred ninety grams of styrene-acrylic acid polymer was weighed. The styrene-acrylic acid polymer had a weight-average molecular weight of 8,000, an acid value of 140 mgKOH/g, and a polydispersity Mw/Mn of 1.5 (wherein Mw denotes the weight-average molecular weight, and Mn denotes the number-average molecular weight). Eighteen hundred grams of distilled water and then potassium hydroxide for neutralizing the polymer were added to the styrene-acrylic acid polymer. The styrene-acrylic acid polymer was dissolved in the distilled water while stirring to prepare an aqueous styrene-acrylic acid polymer solution. Five hundred grams of the dispersion (2) was then added dropwise to the aqueous styrene-acrylic acid polymer solution while stirring. This mixture of the dispersion (2) and the aqueous styrene-acrylic acid polymer solution was transferred to an evaporating dish, was heated at 150 degrees Celsius for 15 hours, was dried, and was cooled to room temperature.

The dried product was then dispersed in distilled water, which was adjusted to pH 9.0 with potassium hydroxide in advance, with a dispersing apparatus. 1.0 N aqueous potassium hydroxide was added to the dispersion while stirring to adjust the pH within the range of 10 to 11. The dispersion was then desalinated and purified to remove impurities and coarse particles. Through these procedures, a pigment dispersion B containing polymer-bonded self-dispersing carbon black dispersed in water was prepared. The pigment dispersion B had a solid content of 10.0% and a pH of 10.1. The average particle size of pigment was 130 nm.

Preparation of Pigment Dispersion C

Ten parts of carbon black having a specific surface area of 210 m$^2$/g and a DBP absorption of 74 mL/100 g, 20 parts of a styrene-acrylic acid copolymer having an acid value of 200 mgKOH/g and a weight-average molecular weight of 10,000 neutralized with 10% aqueous potassium hydroxide, and 70 parts of water were mixed. This mixture was dispersed in a sand grinder for one hour, was centrifuged to remove coarse particles, and was filtrated under pressure through a microfilter having a pore size of 3.0 micrometers (manufactured by FUJIFILM Co.). Through these procedures, a pigment dispersion C containing polymer-dispersed carbon black dispersed in water was prepared. The pigment dispersion C had a solid content of 10.0% and a pH of 10.0. The average particle size of pigment was 120 nm.

added to neutralize the carboxy group, the urethane prepolymer solution was then cooled to 40 degrees Celsius. After ion-exchanged water was added to the urethane prepolymer solution, the urethane prepolymer solution was emulsified with a homomixer at a high speed. After the emulsification, a chain extension reaction of the urethane prepolymer was performed with a chain extension agent (portion D) at 30 degrees Celsius for 12 hours. When FT-IR showed the absence of the isocyanate group, the polymer solution was heated under reduced pressure to evaporate methyl ethyl ketone, yielding polyurethane polymer dispersions PU-1 to PU-19 each having a polyurethane polymer content of 20.0% and a weight-average molecular weight of 30,000. The acid value of the polyurethane polymer was measured by potentiometric titration with the potassium hydroxide-methanol titrant. Table 2 shows the preparation conditions and properties of the polyurethane polymer dispersions.

TABLE 2

Preparation conditions and properties of polyurethane polymer dispersions

| Polyurethane polymer dispersion | Polyisocyanate Type | A (parts) | Polyol having no acid group Type | B (parts) | TMP (parts) | Polyol having acid group Type | C (parts) | Chain extension agent Type | D (parts) | Acid value (mgKOH/g) | Tri- and higher-functional polyamine (mol %)*1 | THF gel fraction (%) |
|---|---|---|---|---|---|---|---|---|---|---|---|---|
| PU-1 | IPDI | 35.3 | PPG | 50.4 | — | DMPA | 14.3 | DETA | 1.8 | 60 | 80 | 100 |
| PU-2 | IPDI | 43.1 | PPG | 37.8 | — | DMPA | 19.1 | DETA | 2.0 | 80 | 80 | 100 |
| PU-3 | IPDI | 51.0 | PPG | 25.2 | — | DMPA | 23.9 | DETA | 2.3 | 100 | 80 | 100 |
| PU-4 | TDI | 28.4 | PPG | 57.3 | — | DMPA | 14.3 | DETA | 1.7 | 60 | 80 | 100 |
| PU-5 | IPDI | 35.3 | PTMG | 50.4 | — | DMPA | 14.3 | DETA | 1.8 | 60 | 80 | 100 |
| PU-6 | IPDI | 35.3 | PC | 50.4 | — | DMPA | 14.3 | DETA | 1.8 | 60 | 80 | 100 |
| PU-7 | IPDI | 35.3 | PES | 50.4 | — | DMPA | 14.3 | DETA | 1.8 | 60 | 80 | 100 |
| PU-8 | IPDI | 35.1 | PPG | 49.1 | — | DMBA | 15.8 | DETA | 1.8 | 60 | 80 | 100 |
| PU-9 | IPDI | 35.3 | PPG | 50.4 | — | DMPA | 14.3 | TETA | 2.0 | 60 | 80 | 100 |
| PU-10 | Desmodur N3400 | 62.4 | PPG | 23.3 | — | DMPA | 14.3 | EDA | 4.0 | 60 | — | — |
| PU-11 | IPDI | 35.3 | PPG | 50.4 | 2.0 | DMPA | 14.3 | EDA | 1.6 | 60 | — | — |
| PU-12 | IPDI | 35.3 | PPG | 50.4 | — | DMPA | 14.3 | DETA | 0.9 | 60 | 40 | 95 |
| PU-13 | IPDI | 35.3 | PPG | 50.4 | — | DMPA | 14.3 | DETA | 0.7 | 60 | 39 | 93 |
| PU-14 | IPDI | 35.3 | PPG | 50.4 | — | DMPA | 14.3 | EDA | 1.6 | 60 | — | — |
| PU-15 | IPDI | 34.9 | PPG | 51.0 | — | DMPA | 14.1 | DETA | 1.8 | 59 | 80 | 100 |
| PU-16 | IPDI | 51.4 | PPG | 24.5 | — | DMPA | 24.1 | DETA | 2.7 | 101 | 80 | 100 |
| PU-17 | IPDI | 27.5 | PPG | 63.0 | — | DMPA | 9.6 | DETA | 1.4 | 40 | 80 | 97 |
| PU-18 | IPDI | 54.9 | PPG | 18.9 | — | DMPA | 26.3 | DETA | 2.9 | 110 | 80 | 100 |
| PU-19 | IPDI | 27.5 | PPG | 63.0 | — | DMPA | 9.6 | EDA | 1.3 | 40 | — | — |

*1: Tri- and higher-functional polyamine based on residual isocyanate in urethane prepolymer (mol %)
IPDI: isophorone diisocyanate
TDI: tolylene diisocyanate
Desmodur N3400: hexamethylene diisocyanate dimer (40%) + trimer (60%) (manufactured by Bayer AG)
PPG: poly(propylene glycol) (number-average molecular weight = 2,000)
PTMG: poly(tetramethylene glycol) (number-average molecular weight = 2,000)
PC: polycarbonate diol (number-average molecular weight = 2,000)
PES: polyester polyol (number-average molecular weight = 2,000)
TMP: trimethylolpropane
DMPA: dimethylolpropionic acid
DMBA: dimethylolbutanoic acid
DETA: diethylenetriamine
TETA: triethylenetetramine
EDA: ethylenediamine Preparation of Polyurethane Polymer Dispersion A polyol having no acid group (portion B) was sufficiently dissolved in methyl ethyl ketone while stirring. A polyisocyanate (portion A) and a diol having an acid group (portion C) (and 2.0 parts of trimethylolpropane in the case of PU-11) were then added to the solution. A reaction at 75 degrees Celsius for one hour yielded a urethane prepolymer solution. The urethane prepolymer solution was then cooled to 60 degrees Celsius. After aqueous potassium hydroxide was Identification of Cross-Linked Structure of Polyurethane Polymer by Gel Fraction The presence of a cross-linked structure in the polyurethane polymer molecule was investigated by measuring the MEK gel fractions of the polyurethane polymer dispersions PU-1 to PU-19. First, a polyurethane polymer dispersion was weighed on a plate and was left to stand at 35 degrees Celsius to form a polyurethane polymer film. The film placed on a filter paper was subjected to Soxhlet extraction in MEK. The mass of the residual film on the filter paper after the extraction was divided by the mass of the film before the extraction to determine the MEK gel fraction. The MEK gel fraction was substituted into the formula (1) to determine if the polyurethane polymer had a cross-linked structure. The results showed that the polyurethane polymers other than PU-14 and PU-19 had a cross-linked structure. Table 3 shows the presence or absence of a cross-linked structure in representative polyurethane polymer dispersions.

TABLE 3

Relationship between formula (1) and presence of cross-linked structure

| Polyurethane polymer dispersion | MEK gel fraction (%) | Value calculated by formula (1)*1 | Presence of cross-linked structure | Monomer providing cross-linked structure |
|---|---|---|---|---|
| PU-1 | 94 | 86 | Yes | DETA |
| PU-9 | 97 | 86 | Yes | TETA |
| PU-10 | 91 | 86 | Yes | Desmodur N3400 |
| PU-11 | 88 | 86 | Yes | TMP |
| PU-14 | 44 | 86 | No | — |
| PU-19 | 35 | 57 | No | — |

*1 Acid value × 1.45-1.20
DETA: diethylenetriamine
TETA: triethylenetetramine
Desmodur N3400: hexamethylene diisocyanate dimer (40%) + trimer (60%)
TMP: trimethylolpropane Measurements were conducted of the THF gel fractions of the polyurethane polymer dispersions PU-1 to 9, 12 to 13, and 15 to 18, which were shown to have a cross-linked structure. On the basis of these measurements, the polyurethane polymers were examined for the usage of 40% by mole or more trifunctional or higher functional polyamine based on the amount of residual isocyanate group in the urethane prepolymer. First, a polyurethane polymer dispersion was weighed on a plate and was left to stand at 35 degrees Celsius to form a polyurethane polymer film. The film was then immersed in THF for 24 hours. The mass of the residual polyurethane polymer film insoluble in THF was divided by the mass of the polyurethane polymer film before the immersion to determine the THF gel fraction (Table 2). A polyurethane polymer having a THF gel fraction of 95% or more was considered that the amount of trifunctional or higher functional polyamine was 40% by mole or more based on the amount of residual isocyanate group in the urethane prepolymer. The results showed that 40% by mole or more trifunctional or higher functional polyamine based on the amount of residual isocyanate group in the urethane prepolymer was used in the polyurethane polymers having a cross-linked structure other than PU-13.

Preparation of Ink

A mixture of components listed in the following Tables 4 to 6 was sufficiently dispersed and was filtrated under pressure through a microfilter having a pore size of 3.0 micrometers (manufactured by FUJIFILM Co.) to prepare an ink The inks according to Examples 1 to 20 had a viscosity of 6 cps or less at 25 degrees Celsius. Cab-O-Jet400 in Tables 4 to 6 is a self-dispersing pigment (pigment content=15.0%) manufactured by Cabot Co. Acetylenol E-100 is a surfactant manufactured by Kawaken Fine Chemicals Co., Ltd.

TABLE 4

Compositions of inks (unit: %)

| | Example 1 | Example 2 | Example 3 | Example 4 | Example 5 | Example 6 | Example 7 | Example 8 | Example 9 | Example 10 |
|---|---|---|---|---|---|---|---|---|---|---|
| Cab-O-Jet400 | 26.67 | — | — | 26.67 | 26.67 | 26.67 | 24.00 | 14.08 | 26.67 | 13.93 |
| Pigment dispersion A | — | 40.00 | — | — | — | — | — | — | — | — |
| Pigment dispersion B | — | — | 40.00 | — | — | — | — | — | — | — |
| PU-1 | 5.00 | 5.00 | 5.00 | — | — | — | 1.80 | 9.50 | 1.80 | 9.50 |
| PU-2 | — | — | — | 5.00 | — | — | — | — | — | — |
| PU-3 | — | — | — | — | 5.00 | — | — | — | — | — |
| PU-4 | — | — | — | — | — | 5.00 | — | — | — | — |
| Glycerin | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Acetylenol E-100 | 0.10 | 0.10 | 0.10 | 0.10 | 0.10 | 0.10 | 0.10 | 0.10 | 0.10 | 0.10 |
| Pure water | 49.23 | 35.90 | 35.90 | 49.23 | 49.23 | 49.23 | 55.10 | 57.32 | 52.43 | 57.47 |
| Polyurethane polymer content | 1.00 | 1.00 | 1.00 | 1.00 | 1.00 | 1.00 | 0.36 | 1.90 | 0.36 | 1.90 |
| Polyurethane polymer content/self-dispersing pigment content | 0.25 | 0.25 | 0.25 | 0.25 | 0.25 | 0.25 | 0.10 | 0.90 | 0.09 | 0.91 |

TABLE 5

Compositions of inks (unit: %)

| | Example 11 | Example 12 | Example 13 | Example 14 | Example 15 | Example 16 | Example 17 | Example 18 | Example 19 | Example 20 |
|---|---|---|---|---|---|---|---|---|---|---|
| Cab-O-Jet400 | 26.67 | 26.67 | 26.67 | 26.67 | 26.67 | 26.67 | 26.67 | 26.67 | 26.67 | 26.67 |
| PU-1 | 10.00 | — | — | — | — | — | — | — | — | — |
| PU-5 | — | 5.00 | — | — | — | — | — | — | — | — |
| PU-6 | — | — | 5.00 | — | — | — | — | — | — | — |

TABLE 5-continued

Compositions of inks (unit: %)

| | Example 11 | Example 12 | Example 13 | Example 14 | Example 15 | Example 16 | Example 17 | Example 18 | Example 19 | Example 20 |
|---|---|---|---|---|---|---|---|---|---|---|
| PU-7 | — | — | — | 5.00 | — | — | — | — | — | — |
| PU-8 | — | — | — | — | 5.00 | — | — | — | — | — |
| PU-9 | — | — | — | — | — | 5.00 | — | — | — | — |
| PU-10 | — | — | — | — | — | — | 5.00 | — | — | — |
| PU-11 | — | — | — | — | — | — | — | 5.00 | — | — |
| PU-12 | — | — | — | — | — | — | — | — | 5.00 | — |
| PU-13 | — | — | — | — | — | — | — | — | — | 5.00 |
| Glycerin | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Acetylenol E-100 | 0.10 | 0.10 | 0.10 | 0.10 | 0.10 | 0.10 | 0.10 | 0.10 | 0.10 | 0.10 |
| Pure water | 44.23 | 49.23 | 49.23 | 49.23 | 49.23 | 49.23 | 49.23 | 49.23 | 49.23 | 49.23 |
| Polyurethane polymer content | 2.00 | 1.00 | 1.00 | 1.00 | 1.00 | 1.00 | 1.00 | 1.00 | 1.00 | 1.00 |
| Polyurethane polymer content/self-dispersing pigment content | 0.50 | 0.25 | 0.25 | 0.25 | 0.25 | 0.25 | 0.25 | 0.25 | 0.25 | 0.25 |

TABLE 6

Compositions of inks (unit: %)

| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|
| Cab-O-Jet400 | — | 26.67 | 26.67 | 26.67 | 26.67 | 26.67 | — | — | 26.67 | — |
| Pigment dispersion C | 40.00 | — | — | — | — | — | 40.00 | 40.00 | — | 40.00 |
| PU-1 | 5.00 | — | — | — | — | — | — | — | — | — |
| PU-14 | — | 5.00 | — | — | — | — | 5.00 | — | — | — |
| PU-15 | — | — | 5.00 | — | — | — | — | — | — | — |
| PU-16 | — | — | — | 5.00 | — | — | — | — | — | — |
| PU-17 | — | — | — | — | 5.00 | — | — | 5.00 | — | — |
| PU-18 | — | — | — | — | — | 5.00 | — | — | — | — |
| PU-19 | — | — | — | — | — | — | — | — | 5.00 | 5.00 |
| Glycerin | 9.00 | 9.00 | 9.00 | 9.00 | 9.00 | 9.00 | 9.00 | 9.00 | 9.00 | 9.00 |
| Diethylene glycol | 5.00 | 5.00 | 5.00 | 5.00 | 5.00 | 5.00 | 5.00 | 5.00 | 5.00 | 5.00 |
| Triethylene glycol | 5.00 | 5.00 | 5.00 | 5.00 | 5.00 | 5.00 | 5.00 | 5.00 | 5.00 | 5.00 |
| Acetylenol E-100 | 0.10 | 0.10 | 0.10 | 0.10 | 0.10 | 0.10 | 0.10 | 0.10 | 0.10 | 0.10 |
| Pure water | 35.90 | 49.23 | 48.23 | 49.23 | 49.23 | 49.23 | 35.90 | 35.90 | 49.23 | 35.90 |
| Polyurethane polymer content | 1.00 | 1.00 | 1.00 | 1.00 | 1.00 | 1.00 | 1.00 | 1.00 | 1.00 | 1.00 |
| Polyurethane polymer content/self-dispersing pigment content | 0.25 | 0.25 | 0.25 | 0.25 | 0.25 | 0.25 | 0.25 | 0.25 | 0.25 | 0.25 |

Polyurethane polymer dispersions PU-20 to PU-27 and inks according to Comparative Examples 11 to 18 were prepared as described below.

Comparative Example 11

A mixture of a polycarbonate/polyester diol (Desmophen VPLS2391, manufactured by Bayer AG), acetone, and dibutyltin dilaurate (a catalyst) was heated to 40 degrees Celsius in a reactor. Isophorone diisocyanate (IPDI) was added to the reactor for 60 minutes. An acetone rinse was then added to the reactor. The reaction temperature was maintained below 52 degrees Celsius. The NCO value of a prepolymer was measured by titration. Thirty minutes after IPDI was completely added, DMPA, triethylamine (TEA), and an acetone rinse (10.3 g) were added to react with excessive isocyanate. The reaction was completed in approximately 60 minutes (as determined by NCO titration). For phase transition, 1364.7 g of deionized water was added for 10 minutes. Immediately after deionized water was completely added, 6.25% aqueous EDA solution and a water rinse (34.5 g) were added to the reactor. The dispersion was stirred at 50 degrees Celsius for another two hours. Acetone was distilled under reduced pressure to yield a dispersion having a solid content of 40%. A polyurethane polymer PU-20 having a solid content of 20% (an acid value of 31.55 mgKOH/g) was prepared.

6.5% NIPex 180 (manufactured by Degussa AG), 8.3% glycerol, 9% ethylene glycol, 7.5% 1,2-hexanediol, 3% EDTA, 1.2% Surfynol 485 (an ethoxylated nonionic surfactant, manufactured by Air Products and Chemicals, Inc.), 2% PU-20, and water were then added to the reactor.

Comparative Example 12

0.2 parts of a polymerization initiator, potassium persulfate, was added to 100 parts of ion-exchanged water while stirring in a nitrogen atmosphere at 70 degrees Celsius in a reactor equipped with a dropping apparatus, a thermometer, a water-cooled reflux condenser, and an agitator. A monomer solution containing 0.05 parts of sodium lauryl sulfate, 15 parts of styrene, 1 part of a urethane prepolymer composed of tolylene diisocyanate (TDI) and 1,5-pentanediol, 15 parts of butyl methacrylate, and 0.02 parts of t-dodecyl mercaptan in 7 parts of ion-exchanged water was added dropwise to the reactor at 70 degrees Celsius to prepare a primary substance. Two parts of 10% ammonium persulfate was added to the primary substance while stirring. A solution containing 30 parts of ion-exchanged water, 0.2 parts of potassium lauryl sulfate, 30 parts of styrene, 1 part of acrylamide, 15 parts of butyl methacrylate, 1 part of dipentaerythritol hexamethacrylate, and 0.6 parts of t-dodecyl mercaptan was added to the reactor at 70 degrees Celsius while stirring, thus initiating the polymerization reaction. The solution was neutralized with ammonia to pH in the range of 8.0 to 8.5 and was filtered through a 0.3-micrometer filter to yield a polymer emulsion. The polymer emulsion had a core-shell structure. The core was composed of a mixture of a polymer having a urethane bond (PU-21) and a copolymer of styrene and acrylic acid. These polymers had a cross-linked structure. The shell was composed of a methacrylate-acrylamide polymer having a carboxy group of methacrylic acid and an amide group of acrylamide on the surface.

An ink according to Comparative Example 12 was prepared using the polymer emulsion described above. 7.0% Microjet CW1 (manufactured by Orient Chemical Industries Co., Ltd.), 0.2% Surfynol 104 (manufactured by Nissin Chemical Industry Co., Ltd.), 1.2% Surfynol 465 (manufactured by Nissin Chemical Industry Co., Ltd.), 2.5% polymer emulsion, 5.0% 1,5-pentanediol, 15.0% glycerin, 5.0% diethylene glycol, 5.0% thiodiglycol, 1.0% 2-pyrrolidone, 2.5% triethanolamine, 0.01% potassium hydroxide, and water were further added.

Comparative Example 13

A flask was charged with 65 parts of 2,2-dimethylolpropionic acid, 326 parts of a polyester polyol (the number-average molecular weight=2,000), and 500 parts of methyl ethyl ketone. The mixture was heated to 50 degrees Celsius with a nitrogen seal while stirring. After 109 parts of IPDI was added to the mixture, the mixture was allowed to react at 80 degrees Celsius for two hours. The infrared absorption line spectrum analysis showed the absence of a residual isocyanate group. A polyurethane polymer PU-22 having a non-volatile content of 80% was prepared. The solution of the polyurethane polymer PU-22 had an acid value of 26 mgKOH/g and a hydroxyl value of 26 mgKOH/g. The polyurethane polymer PU-22 had a Gardner viscosity of Z6 at 25 degrees Celsius. Next, 700 parts of PU-22, 87 parts of Raven 5000 (carbon black manufactured by Columbian Chemicals Co.), and 213 parts of methyl ethyl ketone were mixed with a three-roll mill for one minute. This roll milling was performed three times.

Next, 67 parts of the dispersion, 136 parts of PU-22, 11 parts of triethylamine, 47.6 parts of Burnock DN-901S (an isocyanurate-containing polyisocyanate produced from hexamethylene diisocyanate, manufactured by DIC Co., the isocyanate content=17.7% based on solids), 0.2 parts of dibutyltin dilaurate, and 140 parts of methyl ethyl ketone were homogeneously mixed to yield an organic phase. The organic phase was gradually added to 570 parts of water vigorously agitated with an agitator to yield a black dispersion. An aqueous solution containing 24 parts of water and 4.2 parts of diethylenetriamine was then gradually added to this dispersion. The dispersion was stirred for 30 minutes and was held at 80 degrees Celsius for one hour. The dispersion was distilled at 80 degrees Celsius under reduced pressure to remove methyl ethyl ketone from the dispersion. The resulting fine particle dispersion had a non-volatile content of 25%. Sixty parts of the fine particle dispersion passed through a Millipore filter having a pore size of 1.0 micrometer was mixed with 20 parts of glycerin and 20 parts of water to prepare an ink.

Comparative Example 14

A flask was charged with 62 parts of 2,2-dimethylolpropionic acid, 156 parts of IPDI, and 200 parts of ethyl acetate. The mixture was heated at 80 degrees Celsius for four hours with a nitrogen seal while stirring. After the isocyanate content was no longer decreased, the flask was cooled to 50 degrees Celsius, and 582 parts of Placcel 212 (a polycaprolactone diol, manufactured by Daicel Chemical Industries, Ltd., the number-average molecular weight=1,250) was added. The flask was then heated at 80 degrees Celsius for two hours. The infrared absorption line spectrum analysis showed the absence of a residual isocyanate group. A polyurethane polymer PU-23 having a non-volatile content of 80% was prepared. The solution of the polyurethane polymer PU-23 had an acid value of 26 mgKOH/g and a hydroxyl value of 26 mgKOH/g. The polyurethane polymer PU-23 had a Gardner viscosity of Z6 at 25 degrees Celsius.

18.8 parts of C. I. Solvent Black 43 (manufactured by Hodogaya Chemical Co., Ltd.) was dissolved in 136 parts of methyl ethyl ketone. The solution was mixed with 146 parts of PU-23 and 7.5 parts of triethylamine and then with 41 parts of Burnock DN-980S (an isocyanurate-containing polyisocyanate produced from hexamethylene diisocyanate, manufactured by DIC Co., the isocyanate content=21.0%) and 0.1 parts of dibutyltin dilaurate to yield an organic phase. The organic phase was gradually added to 628 parts of water vigorously agitated with an agitator to yield a dispersion. An aqueous solution containing 31 parts of water and 3.5 parts of diethylenetriamine was then gradually added to this dispersion. The dispersion was stirred for 30 minutes and was held at 80 degrees Celsius for one hour. The dispersion was distilled at 80 degrees Celsius under reduced pressure to remove methyl ethyl ketone from the dispersion. The resulting fine particle dispersion had a non-volatile content of 25%. Sixty parts of the fine particle dispersion passed through a Millipore filter having a pore size of 1.0 micrometer was mixed with 20 parts of glycerin and 20 parts of water to prepare an ink.

Comparative Example 15

A reactor was charged with 186.9 parts of Placcel 212 and 100.0 parts of IPDI. The mixture was heated to 110 degrees Celsius while stirring. After one hour, the mixture was cooled to 80 degrees Celsius and was mixed with 20.1 parts of DMPA, 0.3 parts of dibutyltin dilaurate, and 76.8 parts of ethyl acetate. The mixture was allowed to react at 80 degrees Celsius for two hours. 16.2 parts of Burnock DN-980S (an HDI biuret polyisocyanate, manufactured by Dainippon Ink and Chemicals, Inc., NCO content=20%) and 408 parts of MEK were added to the mixture. The NCO content was 4.9% based on solids.

The mixture was cooled to 30 degrees Celsius or less and was mixed with 15.2 parts of TEA and then with 1293 parts of ion-exchanged water to yield an oil-in-water (O/W) emulsion. After 234 parts of 5% aqueous DETA was gradually added to the mixture, the mixture was stirred at 60 degrees Celsius for 30 minutes. The mixture was then distilled under reduced pressure to partly remove the solvent and water. The product was slightly milk-white translucent liquid. The addition of THF to a small amount of product in a test tube produced turbidity, indicating the presence of an insoluble cross-linked structure. The product had a non-volatile content of 35.6%, a viscosity of 340 cps, and a pH of 7.7. The product is hereinafter referred to as polyurethane polymer PU-24.

A coupler 2-hydroxynaphthalene-3-carboamide and a diazo compound 3-amino-4-methoxybenzanilide were coupled to prepare a rouge pigment slurry having a pH of 12. The pH of the rouge pigment slurry was adjusted to 9 with 5% hydrochloric acid. After 16.9 parts of PU-24 was added to the slurry, the slurry was agitated for one hour. A 5% hydrochloric acid solution was gradually added to the slurry to pH 5 or less to precipitate a pigment/polymer mixture. The precipitate was filtered and washed with water, yielding 41.7 parts of a pigment/polymer wet cake containing 10 parts of the pigment, 6 parts of the polymer, and 25.7 parts of water. 41.7 parts of the pigment/polymer wet cake was mixed with 10 parts of isopropyl alcohol and 0.4 parts of 28% aqueous ammonia with a Homo Disper agitator to redisperse the precipitated polymer, thus preparing an ink.

Comparative Example 16

A four-neck flask equipped with a thermometer, an agitator, a nitrogen inlet, and a condenser tube was charged with 98 g of Placcel 205BA (a carboxylic-acid-modified polycaprolactone diol, manufactured by Daicel Chemical Industries, Ltd.), 9 g of trimethylolpropane (TMP), 120 g of MEK, and 0.54 g of 1,4-diazabicyclo[2.2.2]octane. Placcel 205BA is a carboxylic-acid-modified polycaprolactone diol, in which dimethylolbutanoic acid is modified with a lactone. Placcel 205BA has an acid value of 110 mgKOH/g, a weight-average molecular weight of 500, and a hydroxyl value of 220 mgKOH/g. After Placcel 205BA, TMP, MEK, and 1,4-diazabicyclo[2.2.2]octane were agitated for 30 minutes, 73 g of IPDI was added to the four-neck flask. After agitation at room temperature in a nitrogen atmosphere for one hour, a reaction was performed at 70 degrees Celsius for four hours. After the reaction, the product was cooled to room temperature, yielding a solution 1 containing 60% urethane prepolymer. 17.7 g of 50% aqueous potassium hydroxide and 350 g of ion-exchanged water were mixed with 250 g of the urethane prepolymer solution 1 in the four-neck flask at room temperature for 30 minutes. The mixture was heated to 80 degrees Celsius in a nitrogen atmosphere and was subjected to a chain extension reaction at 80 degrees Celsius for two hours. After the reaction, MEK and part of water were removed with a rotatory evaporator and an aspirator. Ion-exchanged water was added such that the amount of recovery was 429 g, thus yielding an aqueous solution containing a neutralizing agent and 35% polyurethane polymer (polyurethane polymer PU-25). The percentage of a polyol having an acid group in all compounds having a hydroxy group in the polyurethane polymer PU-25 was 75% by mole. The percentage of a compound having three hydroxy groups was 25% by mole. The polyurethane polymer PU-25 had an acid value of 74 mgKOH/g and a weight-average molecular weight of 38,000.

After 3 kg of carbon black (MA-100, manufactured by Mitsubishi Chemical Co.) was mixed with 10 kg of water, the mixture was added to 4.5 kg of a sodium hypochlorite solution (available chlorine concentration=12%). After stirring at a temperature in the range of 100 to 105 degrees Celsius for 10 hours, the product was filtered. Dried wet crystals were washed with water and were dried at 80 degrees Celsius to yield 2.5 kg of oxidized carbon black. The oxidized carbon black was mixed with ion-exchanged water to prepare a slurry. The slurry was dialyzed with a poly(methyl methacrylate) dialysis module (Filtryzer B3-20A, manufactured by Toray Industries, Inc.) to remove sodium ions and chloride ions in oxidized carbon black and was dried to yield dialyzed oxidized carbon black. A mixture of 120 g of the dialyzed oxidized carbon black, 180 g of triethylene glycol monobutyl ether, and 700 g of ion-exchanged water was agitated with a Homo Disper agitator to prepare a slurry. A beaker containing the slurry was connected to a circulation-type bead mill (DYNO-Mill KDL-A, manufactured by Willy A. Bachofen AG) through a tube. The slurry was dispersed with zirconia beads having a diameter of 0.3 mm at 1,600 rpm for three hours to prepare an aqueous black pigment dispersion. 0.7 g of 50% aqueous potassium hydroxide, 0.5 g of ion-exchanged water, and 7.1 g of polyurethane polymer PU-25 (polyurethane polymer content=35%) were added to 41.7 g of the aqueous black pigment dispersion to prepare an aqueous black pigment dispersion (pigment content=10%, polyurethane polymer content=5%). 25.8 g of ion-exchanged water, 3.5 g of glycerin, 1.7 g of 2-pyrrolidone, and 1.5 g of ethylene glycol were then added to 17.5 g of the aqueous black pigment dispersion to prepare an ink (pigment content=3.5%, polyurethane polymer content=1.75%).

Comparative Example 17

In the same manner as in Comparative Example 16, 102 g of Placcel 205BA, 7 g of TMP, 71 g of IPDI, 120 g of MEK, and 0.54 g of 1,4-diazabicyclo[2.2.2]octane were used to prepare a solution containing 60% urethane prepolymer.

18.4 g of 50% aqueous potassium hydroxide and 350 g of ion-exchanged water were mixed with 250 g of the urethane prepolymer solution in a four-neck flask at room temperature for 30 minutes. In the same manner as in Comparative Example 16, a chain extension reaction, removal of MEK and part of water, and the addition of ion-exchanged water yielded an aqueous solution containing a neutralizing agent and 35% polyurethane polymer (polyurethane polymer PU-26). The percentage of a polyol having an acid group in all compounds having a hydroxy group in the polyurethane polymer PU-26 was 80% by mole. The percentage of a compound having three hydroxy groups was 20% by mole. The polyurethane polymer PU-26 had an acid value of 76 mgKOH/g and a weight-average molecular weight of 32,000. The polyurethane polymer PU-26 and the aqueous pigment dispersion prepared in Comparative Example 16 were used to prepare an ink (pigment content=3.5%, polyurethane polymer content=1.75%) in the same way as in Comparative Example 16.

Comparative Example 18

An alkali- and acid-free dry flask equipped with an addition funnel, a condenser, a stirrer, and a nitrogen gas line was charged with 699.2 g of Desmophen C200, 280.0 g of acetone, and 0.06 g of dibutyltin dilaurate (DBTL). The mixture was heated to 40 degrees Celsius and was sufficiently mixed. 189.14 g of IPDI was added to the flask at 40 degrees Celsius for 60 minutes through the addition funnel. Residual IPDI in the addition funnel was rinsed with 15.5 g of acetone into the flask. The flask was heated at 50 degrees Celsius for approximately 30 minutes. 44.57 g of DMPA and subsequently 25.2 g of TEA were added to the flask through the addition funnel. The addition funnel was then rinsed with 15.5 g of acetone. The flask was heated again at 50 degrees Celsius such that the NCO % reached 1.14% or less. 1498.0 g of deionization (DI) water was added at a temperature of 50 degrees Celsius for 10 minutes. A mixture of 97.5 g of EDA (as a 6.25% aqueous solution) and 29.7 g of TETA (as a 6.25% aqueous solution) were added through the addition funnel for five minutes. The addition funnel was then rinsed with 80.0 g of water. After the mixture was held at 50 degrees Celsius for one hour, the mixture was cooled to room temperature. Acetone (31.0 g) was removed under vacuum to prepare a final polyurethane dispersion having an approximately 35.0% solid content. In the polyurethane dispersion, crosslinking was performed with TETA. A dispersion of polyurethane polymer PU-27 thus prepared had an acid value of 40 mgKOH/g, a viscosity of 66 cps, a solid content of 35.2%, a pH of 7.48, an average particle size of 65 nm, and a THF insoluble matter content of 5%.

The following raw materials were sufficiently mixed to prepare a black dispersion. (i) 210.4 parts of deionized water, (ii) 80.3 parts of a 41.5% (solid) anion polymer dispersant, and (iii) 9.24 parts of dimethylethanolamine The anion polymer dispersant was a graft copolymer 66.3/-g-4.2/29.5 POEA/-g-ETEGMA/MAA prepared in "Preparation of Dispersant 1" of U.S. Patent Application Publication 20030128246. The monomer ratio was changed from 61.6/5.8/32.6 in the publication to 66.2/4.2/29.5. A hundred parts of a black pigment (NIPex 180IQ, manufactured by Degussa AG) was gradually added to the black dispersion. The black dispersion was then mixed with 100 parts of deionized water to prepare a mill base. The mill base was circulated through a medium mill to pulverize the mill base. 55.4 parts of deionized water was added for dilution. The resulting 15% dispersion had a viscosity of 8.60 cps (as measured with a Brookfield viscometer at 20 degrees Celsius), a pH of approximately 7.5, and a median particle size of 92 nm.

4.25% of the black dispersion, 11% of the polyurethane polymer dispersion, 3% dipropylene glycol methyl ether, 8% glycerol, 11% ethylene glycol, 0.2% Surfynol 104E, 0.2% Silwet L77, and water were used to prepare an ink Evaluation In the following evaluation, the criteria AA to B refer to acceptable levels, and the criterion C refers to an unacceptable level.

Dynamic Viscoelasticity

An ink prepared as described above was applied to a release paper such that the dry film thickness ranged from 0.3 to 0.5 mm, and was dried overnight in an oven at 60 degrees Celsius to form a film. A dumbbell-shaped specimen was cut from the film. The dynamic viscoelasticity of the specimen was measured under the following conditions. A temperature at an inflection point of a temperature-storage modulus E' curve was considered as the glass transition temperature.

Measuring apparatus: EXSTAR6000 DMS (manufactured by SII NanoTechnology Inc.)

Compression stimulus: load control, a static load of approximately 200 mN, a strain amplitude of 10.0 micrometers, a sine wave Temperature program: Decrease from 20 to −100 degrees Celsius at 5 degrees Celsius/minutes and hold at −100 degrees Celsius for five minutes. Then, increase from −100 to 200 degrees Celsius at 2 degrees Celsius/minutes.

Frequency: 0.5, 1.0, 2.0, 5.0, and 10.0 Hz

Films prepared from the inks according to Examples 1 to 19 showed a peak derived from the glass transition temperature in a range of 50 degrees Celsius or less and a range of 50 degrees Celsius or more. Films prepared from the inks according to Comparative Examples 1 to 18 showed only one or no peak derived from the glass transition temperature in a measurement temperature range.

Optical Density

An ink cartridge was filled with an ink prepared as described above and was mounted in an ink jet recording apparatus PIXUS iP3100 (manufactured by CANON KABUSHIKI KAISHA). A 2 cm×2 cm solid image (print duty=100%) was printed on four recording media, that is, a PPC sheet GF-500 (manufactured by CANON KABUSHIKI KAISHA), a PPC sheet 4024 (manufactured by Xerox Co.), a PPC sheet Bright White (manufactured by Hewlett-Packard Co.), and a PPC sheet Hammermill Jet Print (manufactured by International Paper). Recording conditions were as follows: temperature=23 degrees Celsius, relative humidity=55%, and the amount of ink per drop=28 ng plus or minus 10% or less. In the ink jet recording apparatus described above, a print duty of 100% corresponds to the conditions under which approximately 28 ng of one ink droplet is applied to a unit area of $1/600$ dpi×$1/600$ dpi at a resolution of 600 dpi×600 dpi. After the solid image was left to stand for one day, the optical density was measured with a reflection densitometer (trade name Macbeth RD-918, manufactured by Macbeth). The following are evaluation criteria for optical density. Tables 7 to 10 show the results.

AA: The average optical density of the four recording media was 1.45 or more.

A: The average optical density of the four recording media was 1.4 or more but less than 1.45.

B: The average optical density of the four recording media was 1.3 or more but less than 1.4.

C: The average optical density of the four recording media was less than 1.3.

Scratch Resistance

An ink cartridge was filled with an ink prepared as described above and was mounted in an ink jet recording apparatus PIXUS iP3100 (manufactured by CANON KABUSHIKI KAISHA). A 1 inch×0.5 inches black solid image (print duty=100%) was printed on a PPC sheet GF-500 (manufactured by CANON KABUSHIKI KAISHA). A Silbon paper and a weight having a contact pressure of 40 g/cm$^2$ were placed on the solid image. The solid image and the Silbon paper were rubbed together. After the Silbon paper and the weight were removed, smudges on the solid image and a transfer to the white ground of the Silbon paper were visually inspected. This test was performed 10 minutes after printing (hereinafter referred to as a "test after 10 minutes") and one day after printing (hereinafter referred to as a "test after one day") using different solid images. The following are evaluation criteria for the scratch resistance of an image. Tables 7 to 10 show the results.

AA: No smudge on the white ground was observed in the test after 10 minutes and the test after one day.

A: Although a small number of smudges on the white ground were observed in the test after 10 minutes, no smudge on the white ground was observed in the test after one day.

B: Although unnoticeable smudges on the white ground were observed in the test after 10 minutes, no smudge on the white ground was observed in the test after one day.

C: Smudges on the white ground were observed in the test after 10 minutes and the test after one day.

Highlighter Resistance

An ink cartridge was filled with an ink prepared as described above and was mounted in an ink jet recording apparatus PIXUS iP3100 (manufactured by CANON KABUSHIKI KAISHA). A $1/10$-inch vertical rule was printed on a PPC sheet GF-500 (manufactured by CANON KABUSHIKI KAISHA). Immediately after the vertical rule was traced with a yellow highlighter OPTEX2 (manufactured by ZEBRA Co., Ltd.), a line was drawn with the yellow highlighter on the white ground to check for contamination of the pen nib and contamination of the line on the white ground. This test was performed five minutes after printing (hereinafter referred to as a "test after five minutes") and one day after printing (hereinafter referred to as a "test after one day"). The following are evaluation criteria for highlighter resistance. Tables 7 to 10 show the results.

AA: No contamination of the pen nib and no contamination of the line on the white ground were observed in the test after five minutes and in the test after one day.

A: In the test after five minutes, although a slight coloring on the pen nib was observed, little contamination of the line on the white ground was observed. In the test after one day, there were no contamination of the pen nib and no contamination of the line on the white ground.

B: In the test after five minutes and the test after one day, although a slight coloring on the pen nib was observed, little contamination of the line on the white ground was observed.

C: In the test after five minutes and the test after one day, there were coloring of the pen nib and contamination of the line on the white ground. Ink Ejection Stability An ink cartridge was filled with an ink prepared as described above and was mounted in an ink jet recording apparatus PIXUS iP3100 (manufactured by CANON KABUSHIKI KAISHA). A 19 cm×26 cm solid image (print duty=100%) was printed on ten A4-size GF-500 PPC sheets (manufactured by CANON KABUSHIKI KAISHA). The solid images on the fifth and tenth sheets were visually inspected to evaluate ink ejection stability. The following are evaluation criteria for ink ejection stability. Tables 7 to 10 show the results.

AA: Neither white streak nor faint streak was observed in the fifth and tenth sheets.

A: Neither white streak nor faint streak was observed in the fifth sheet. A few unnoticeable white streaks or faint streaks were observed in the tenth sheet.

B: Neither white streak nor faint streak was observed in the fifth sheet. White streaks or faint streaks were observed with an acceptable level in the tenth sheet.

C: White streaks or faint streaks were observed in the fifth and tenth sheets.

TABLE 7

| | Evaluation results | | | | | | | | | |
|---|---|---|---|---|---|---|---|---|---|---|
| | Example 1 | Example 2 | Example 3 | Example 4 | Example 5 | Example 6 | Example 7 | Example 8 | Example 9 | Example 10 |
| Optical density | AA | AA | A | AA | AA | AA | AA | AA | AA | AA |
| Scratch resistance | AA | AA | AA | AA | AA | AA | AA | AA | A | AA |
| Highlighter resistance | AA | AA | AA | AA | AA | AA | AA | AA | A | AA |
| Ejection stability | AA | AA | AA | AA | AA | AA | AA | AA | AA | A |

TABLE 8

| | Evaluation results | | | | | | | | | |
|---|---|---|---|---|---|---|---|---|---|---|
| | Example 11 | Example 12 | Example 13 | Example 14 | Example 15 | Example 16 | Example 17 | Example 18 | Example 19 | Example 20 |
| Optical density | AA | AA | AA | AA | AA | AA | AA | AA | AA | AA |
| Scratch resistance | AA | AA | A | A | AA | A | B | B | AA | A |
| Highlighter resistance | AA | AA | A | A | AA | A | B | B | AA | A |
| Ejection stability | A | A | B | B | AA | A | A | A | AA | AA |

TABLE 9

| | Evaluation results | | | | | | | | |
|---|---|---|---|---|---|---|---|---|---|
| | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
| Optical density | C | AA | B | AA | C | AA | C | C | B |
| Scratch resistance | AA | C | AA | C | AA | C | C | AA | C |
| Highlighter resistance | AA | C | AA | C | AA | C | C | AA | C |
| Ejection stability | B | AA | C | AA | C | AA | B | C | C |

TABLE 10

| | Comparative Example 10 | Comparative Example 11 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|
| | Evaluation results | | | | | | | | |
| Optical density | C | B | B | C | C | C | B | B | C |
| Scratch resistance | C | C | C | AA | AA | AA | C | C | AA |
| Highlighter resistance | C | C | C | AA | AA | AA | B | B | AA |
| Ejection stability | C | C | B | C | C | C | C | C | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285780 filed Dec. 16, 2009, which is hereby incorporated by reference herein in its entirety.

The invention claimed is:

1. An ink jet ink comprising:
a self-dispersing pigment and a polyurethane polymer,
wherein the polyurethane polymer has units derived from a polyisocyanate, a polyol having no acid group, and a diol having an acid group, has a cross-linked structure, and an acid value of the polyurethane polymer is 60 mgKOH/g or more and 100 mgKOH/g or less,
wherein the polyurethane polymer is cross-linked with a trifunctional or higher functional polyamine, and
wherein the amount of trifunctional or higher functional polyamine is 40% by mole or more based on the amount of residual isocyanate group in a urethane prepolymer.

2. The ink jet ink according to claim 1, wherein the diol having an acid group is at least one of dimethylolpropionic acid and dimethylolbutanoic acid.

3. The ink jet ink according to claim 1, wherein the trifunctional or higher functional polyamine is at least one of diethylenetriamine and triethylenetetramine.

4. The ink jet ink according to claim 1, wherein the polyol having no acid group is a polyether polyol.

5. The ink jet ink according to claim 4, wherein the polyether polyol is poly(propylene glycol).

6. The ink jet ink according to claim 1, wherein the amount (% by mass) of polyurethane polymer is less than 2.0% by mass based on the total mass of the ink, and the ratio of the amount (% by mass) of polyurethane polymer to the amount (% by mass) of self-dispersing pigment based on the total mass of the ink is 0.1 or more and 0.9 or less.

7. An ink cartridge comprising an ink storage portion, wherein an ink in the ink storage portion is an ink jet ink according to claim 1.

8. An ink jet recording method comprising discharging an ink by an ink jet method, wherein the ink is an ink jet ink according to claim 1.

* * * * *